United States Patent [19]

Van Den Bussche

[11] 3,803,347

[45] Apr. 9, 1974

[54] APPARATUS FOR DISPLAYING A COLOR-TELEVISION SIGNAL ON A RECORD CARRIER

[75] Inventor: Willem Van Den Bussche, Emmasingel, Eindhoven, Netherlands

[73] Assignee: U.S. Philips Corporation, New York, N.Y.

[22] Filed: June 23, 1971

[21] Appl. No.: 155,995

[30] Foreign Application Priority Data

June 30, 1970 Netherlands ........................ 7009602

[52] U.S. Cl. ........................ 178/5.4 CD, 178/6.6 TC

[51] Int. Cl. ........................... H04n 5/78, H04n 9/02

[58] Field of Search ........................ 178/5.4 CD, 5.4, 178/6.6 A, 6.6 TC

[56] References Cited

UNITED STATES PATENTS

| | | | |
|---|---|---|---|
| 2,892,022 | 6/1959 | Houghton | 178/5.4 CD |
| 3,629,491 | 12/1971 | Danu | 178/5.4 CD |

FOREIGN PATENTS OR APPLICATIONS

| | | | |
|---|---|---|---|
| 1,188,392 | 4/1970 | Great Britain | 178/5.4 CD |
| 1,191,593 | 5/1970 | Great Britain | 178/5.4 CD |

*Primary Examiner*—Howard W. Britton
*Attorney*—Frank R. Trifari

[57] ABSTRACT

Apparatus for displaying a color television signal which is recorded on a record carrier and comprises a luminance signal frequency modulated on a carrier and a sub-carrier modulated by color information, in which apparatus, during display, the luminance signal is demodulated and the sub-carrier is reconverted into a standard color carrier, the line synchronizing signals separated from the luminance signal being used as a control signal for compensating the frequency and amplitude variations which are due to velocity variations and variations in the properties of the tape.

10 Claims, 3 Drawing Figures

Figure 1:
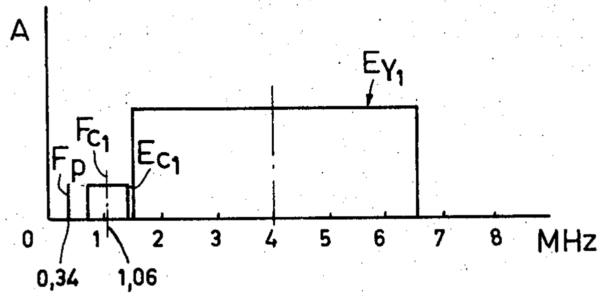
Fig.1 PRIOR ART

*INVENTOR.*
WILLEM VAN DEN BUSSCHE

BY

AGENT

APPARATUS FOR DISPLAYING A COLOR-TELEVISION SIGNAL ON A RECORD CARRIER

The invention relates to an apparatus for displaying a color television signal which is recorded on a record carrier and comprises a luminance signal provided with line and frame synchronization signals, a frequency-modulated carrier, and a sub-carrier which is modulated by the color information and the frequency of which lies between zero and the lower first-order sideband associated with the highest modulation frequency and is rigidly coupled to the line frequency, which apparatus is provided with a device for separating the frequency-modulated luminance signal and the sub-carrier modulated by the color information, a first output of which device is connected to an input of a demodulator for demodulating the frequency-modulated luminance signal, with an oscillator for generating a signal at the frequency of the sub-carrier the output of which is connected to a first input of a first mixer stage, a second input of which is connected to the output of a frequency-stable oscillator having the frequency of the standard color carrier, whilst the output of the first mixer stage is connected to a first input of a second mixer stage, to a second input of which is applied the sub-carrier modulated by the color information and at the output of which a standard color carrier modulated by the color information is separated.

In such an apparatus described in the U.S. Pat. No. 3,580,990 there must be present on the tape a separate pilot signal the frequency of which is lower than that of the lower sideband of the modulated color sub-carrier and which during the display of the video signal serves to obtain a signal having the same frequency as the color sub-carrier and the same frequency variations thereof, so that after mixing with a signal at the frequency of the standard color carrier and mixing of one of the mixing products with the color sub-carrier a frequency-stable standard color carrier modulated by the color information is obtained.

An apparatus according to the invention includes a synchronization separator for separating the line synchronizing signal from the demodulated luminance signal and a circuit arrangement for rigid frequency-coupling of the signal at the frequency of the subcarrier and the separated line synchronizing signal.

Owing to the absence of the control signal there is no need of the additional bandwidth required for this signal, which bandwidth may now be used either to increase the bandwidth of the luminance signal to be recorded or to reduce the overall bandwidth without reducing the bandwidth of the luminance signal.

Moreover, the likelihood of interference of harmonics of the control signal with the other signals recorded is eliminated.

In another embodiment of an apparatus according to the invention the circuit for rigid frequency-coupling of the signal at the sub-carrier frequency and the separated line synchronizing signal comprises a frequency divider, the input of which is coupled to an output of the oscillator for generating a signal at the sub-carrier frequency, whilst at the output of the frequency divider a signal at the frequency of the line synchronizing pulses appears, which output is connected to a first input of the phase discriminator, to a second input of which the separated line synchronizing signal is applied, the output of the phase discriminator being connected to an input of the oscillator for generating the signal at the sub-carrier frequency, for controlling this frequency. Obviously, as an alternative the signal at the sub-carrier frequency may be obtained by multiplying the frequency of the separated line synchronizing signal, however, this method is far more laborious and, moreover, results in a far lower degree of accuracy of the phase of the output signal, which may give rise to undesirable phenomena.

It may be required to eliminate the undesirable amplitude variations of the color sub-carrier derived from the tape relative to the luminance signal, which variations in multi-head machines are additionally increased by differences in the properties of the heads, and for this purpose according to a further feature of the invention provision is made of an and-gate one input of which is connected to the output of the second mixer stage and the other input of which is connected to the output of a delay network the input of which is connected to the output of the frequency divider, the output of the and-gate being connected to a peak detector, the output of which is connected to a control-signal input of a control amplifier, the second input of which is connected to the output of the device for separating the frequency-modulated luminance signal and the sub-carrier modulated by the color information at which this sub-carrier appears, whilst the output of the control amplifier is connected to the second input of the second mixer stage.

The separated line synchronizing signal after being delayed ensures that the burst signal, the amplitude of which is a measure of that of the luminance signal, is separated in the and-gate from the modulated standard color carrier and the peak voltage is determined in a peak detector and used as in the control amplifier a control signal for controlling the amplitude of the color sub-carrier derived from the tape.

In an other embodiment of an apparatus according to the invention, the demodulated luminance signal is added in an adder circuit to the standard color carrier modulated by the color information.

As a result, after demodulation on a high-frequency carrier, the apparatus may directly be connected to the aerial connection of a television receiver by means of a simple twin-conductor cable.

Figure 2:
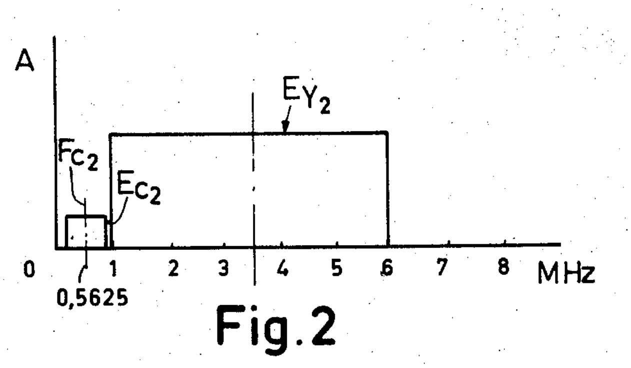
Figure 3:
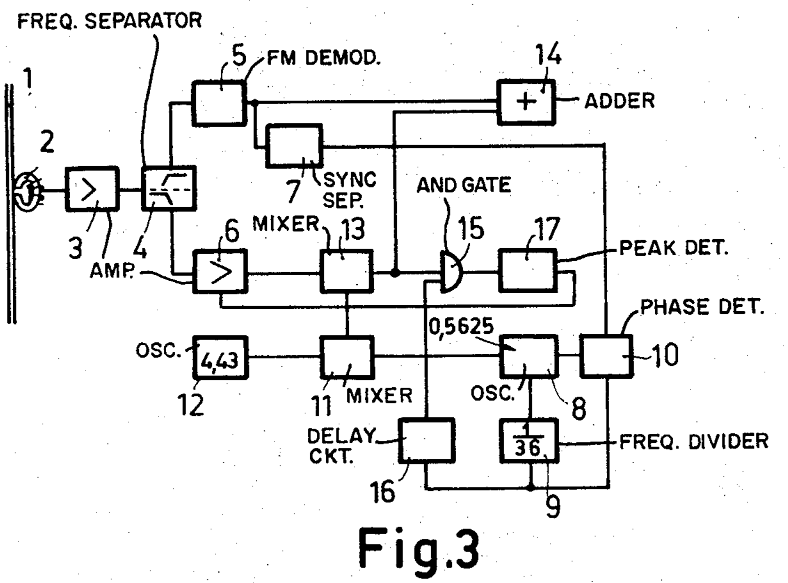

An embodiment of an apparatus for displaying a color television signal recorded on a record carrier according to the invention will now be described, by way of example, with reference to the accompanying diagrammatic drawings, in which:

FIG. 1 shows a spectrum of the signal derived from the tape of the known apparatus, FIG. 2 shows a spectrum of a signal as derived from the tape by the apparatus according to the invention, and FIG. 3 is a block-schematic circuit diagram of an apparatus according to the invention.

FIG. 1 shows a spectrum of a signal as derived from the tape by the known apparatus. $E_{Y1}$ denotes the spectrum of the luminance signal recorded on the tape, and $E_{C1}$ denotes the spectrum of the sub-carrier modulated by the color information, whilst $F_p$ is a control signal at a frequency which has a fixed relationship with the frequency $F_{C1}$ of the color sub-carrier $E_{C1}$. This control signal serves to eliminate the undesirable frequency and amplitude variations, which are due to the scanning-velocity variations of the tape and to variations in the properties of the tape respectively, during the restoring of the video signal to its normal condition in which it includes the color information in the form of a standard color carrier. This control signal requires additional bandwidth so that with a fixed available overall bandwidth the bandwidth of the luminance signal must be reduced.

FIG. 2 shows a spectrum of a signal recorded on the tap which may be converted into a normal video signal by an apparatus according to the invention. The separate control signal is dispensed with and its function is fulfilled by the line synchronizing signal contained in the luminance signal $E_{Y2}$, enabling the frequency $F_{C2}$ of the color sub-carrier to be reduced and the resulting vacancy to be used either to increase the bandwidth of the luminance signal with the same available overall bandwidth or to use a smaller available overall bandwidth of the recorded signal.

FIG. 3 shows a circuit arrangement of an apparatus according to the invention in which the signal recorded on a tape 1 is scanned by a play-back head 2, which applies the signal, if desired via a pre-amplifier 3, to a device 4 for separating the frequency - modulated luminance signal $E_{Y2}$ and the sub-carrier $E_{C2}$ modulated by the color information, which device in this embodiment comprises a high-pass filter which transmits the luminance signal $E_{Y2}$ only to a demodulator 5, and a lowpass filter which transmits the sub-carrier modulated by the color information only to a control amplifier 6.

In the demodulator the frequency-modulated luminance signal is demodulated and is then applied inter alia to a sync separator 7 for separating the line synchronizing signal.

This line synchronizing signal varies in frequency and in phase in the same manner as does the color subcarrier.

An oscillator 8 for generating a signal at the frequency of the sub-carrier is connected to a frequency divider 9, which reduces the frequency of the signal from the oscillator 8 to the line-synchronizing frequency and then applies it to a phase discriminator 10, to the second input of which the separated line synchronizing signal is applied and in which there is derived from the phase deviation between the said two signals a control signal which is applied to the oscillator 8 and so controls the frequency of the oscillator 8 that the frequencies of the signals at the input of the phase discriminator 10 are equal to one another.

Thus, the frequency of the signal at the output of the oscillator 8 will vary in the same manner as does the frequency of the separated line synchronizing signal, and the oscillator output signal is applied to a first input of a first mixer stage 11, to a second input of which there is applied a signal at the frequency of a standard color carrier, which signal is produced by a frequency-stable oscillator 12.

The resulting mixed signal at the output of this first mixer stage 11 again varies in frequency in absolute sense in the same manner as does the signal of the oscillator 8. It is applied to a first input of a second mixer stage 13, to a second input of which is applied the color sub-carrier from the output of the control amplifier 6, and this sub-carrier also varies in frequency in absolute sense in the same manner as does the signal at the first input of the second mixer stage 13. As a result, the output signal of this second mixer stage 13 is a frequency-stable standard color carrier modulated by the color information, which carrier is added in an adder circuit 14 to the demodulated luminance signal.

This provides the advantage that the combined signal after being modulated on a high-frequency carrier may directly be applied to the aerial input of a television receiver, so that only a twin-conductor connection is required.

Alternatively, the luminance signal and the frequency-stable standard color carrier modulated by the color information may separately be applied to a display device, dispensing with the additional modulation, however, this display device must be provided with special terminals which are not provided in current television receivers.

Since in most cases it is desireable to eliminate the amplitude variations of the color sub-carrier derived from the tape relative to the luminance signal, which variations in multi-head machines are increased moreover by differences in the properties of the heads, the output signal of the second mixer stage 13 is applied to an and-gate 15, to which is also applied a signal at the frequency of the line synchronizing signal, which signal is derived from the frequency divider 9 and is delayed in a network 16 by a period of time such that the burst signal is produced at the output of the and-gate 15, which burst signal then is applied to a peak detector 17 at the output of which a control signal is produced which is applied to a control-signal input of the control amplifier 6.

The delay network 16 may, for example, by a monostable multivibrator.

The choice of the frequency of the color sub-carrier is influenced by the possibility of the occurrence of non-linear effects in recording on the tape, which effects may give rise to cross-modulation of the color sub-carrier and the luminance signal, which manifests itself in the picture as a stationary moire. In order to reduce the disturbing effect of such a moire to a minimum it is advantageous in the NTSC system to choose the color sub-carrier to be equal to an odd multiple of one half of the line frequency so that the interference fringes of the two adjacent lines are relatively shifted 180° in phase.

If in the PAL system the frequency of the color subcarrier is made equal to an integral multiple of the line frequency, in any case for the strongest and most conspicuous colors the moire provides minimum inconvenience.

If in the PAL-system these defects are to be equally compensated for for all the colors, the frequency of the color sub-carrier is preferably made equal to an odd multiple of one quarter of the line frequency, but this requires a far more complicated circuit arrangement and in most cases is not necessary.

In an embodiment of the above described circuit arrangement for use in the European PAL system, for example, the frequency of the color sub-carrier was made equal to 36 times the line frequency (15,625 Hz), i.e. 0.5625 MHz, the frequency of the standard color carrier being 4.433 618 75 MHz. If in the first mixer stage 11 not only the input signals but also the signal at the difference frequency are suppressed, at the outputput of this mixer stage 11 a signal at the sum frequency of 4.996 118 75 MHz is obtained. In the second stage the input signals and the signal at the sum frequency of the resulting mixed signal are suppressed, so that the standard color carrier of 4.433 618 75 MHz modulated with the color information is obtained.

The two mixer stages preferably are in the form of push-pull mixer stages, so that the input signals are automatically suppressed.

What is claimed is:

1. A circuit for reproducing a recorded color television signal having luminance, horizontal, and vertical synchronizing components frequency modulating a carrier, and a chrominance component modulating a subcarrier, said subcarrier having a frequency between zero and the lower first order sideband of the highest modulating frequency of said carrier, said subcarrier frequency having a fixed relationship to the frequency of said horizontal synchronizing signal, said circuit comprising means for frequency separating said luminance from said chrominance signals, having an input adapted to receive said recorded signal, and two output means for providing said luminance and chrominance signals respectively; frequency demodulator means having an input coupled to said luminance output, and an output means for providing a demodulated luminance signal; first oscillator means for generating oscillations having a frequency equal to said recorded subcarrier frequency; means coupled to said first oscillator and said chrominance output for demodulating said chrominance signal; and means for eliminating the effects of changes in the record speed on said demodulated chrominance signal comprising a horizontal synchronization signal separator having an input coupled to said demodulating output, and an output; and means coupled between said synchronization separator output and said first oscillator for controlling the frequency thereof in accordance with said speed variations.

2. A circuit as claimed in claim 1 wherein said fixed relationship comprises said subcarrier frequency being an odd multiple of one half of said horizontal frequency.

3. A circuit as claimed in claim 1 wherein said fixed relationship comprises said subcarrier frequency being an integral multiple of said horizontal frequency.

4. A circuit as claimed in claim 1 wherein said fixed relationship comprises said subcarrier frequency being an odd multiple of one quarter of said horizontal frequency.

5. A circuit as claimed in claim 1 wherein said control means comprises a frequency divider having an input coupled to said oscillator and an output means for providing a signal having a frequency equal to said horizontal frequency; a phase detector having a first input coupled to said divider output, a second input coupled to said synchronization separator, and an output means coupled to said oscillator for frequency control thereof.

6. A circuit as claimed in claim 1 further comprising means for controlling the amplitude of said detected chrominance signal including a frequency divider having an input coupled to said oscillator and an output means for supplying a signal having a frequency equal to said horizontal frequency; a delay circuit having an input coupled to said divider output, and an output; an AND gate having a first input coupled to said chrominance demodulator, a second input coupled to said delay circuit output, and an output; a peak detector having input coupled to said gate output, and an output; and a gain controllable amplifier coupled between said separator chrominance signal output and said chrominance detector, and a gain control input coupled to said peak detector output.

7. A circuit as claimed in claim 6 wherein said delay circuit comprises a monostable multivibrator.

8. A circuit as claimed in claim 1 wherein said chrominance demodulator comprises a first mixer having a first input coupled to said oscillator, a second input, and an output; a second oscillator coupled to said second input and having a stable frequency of a standard color subcarrier; and a second mixer having a first input coupled to said first mixer output, a second input coupled to said chrominance output, and an output means for providing a frequency stable standard color carrier modulated by said chrominance signal.

9. A circuit as claimed in claim 8 wherein each of said mixers comprise push-pull mixer means for suppressing input signals.

10. A circuit as claimed in claim 8 further comprising an adder means having two inputs coupled to said luminance and chrominance demodulators to produce a standard composite color signal.

* * * * *